United States Patent Office 2,988,476
Patented June 13, 1961

2,988,476
BACTERIOTOXIC AND FUNGITOXIC COMPOSITIONS
Samuel Allen Heininger, Warson Woods, Mo., assignor to Monsanto Chemical Company, St. Louis, Mo., a corporation of Delaware
No Drawing. Original application Dec. 26, 1957, Ser. No. 705,107, now Patent No. 2,913,470, dated Nov. 17, 1959. Divided and this application May 20, 1959, Ser. No. 814,403
14 Claims. (Cl. 167—30)

The present invention relates to mercury-containing organic complexes and more particularly to new complexes of mercury and certain amino nitriles, to bacteriotoxic and fungitoxic compositions comprising the same and to methods of inhibiting growth of bacteria and fungi in which the new complexes are employed.

According to the invention, there are provided new and valuable complexes of the formula $$Hg(R-NHCH_2CH_2CN)_2$$

in which R is a benzenoid radical of from 6 to 12 carbon atoms. I have found that said complexes are readily prepared by the reaction of an appropriate benzenoid amine, i.e., a compound of the formula $RNH_2$ in which R is as defined above, with acrylonitrile in the presence of a mercuric salt of an organic or inorganic acid.

Benzenoid amines which are suitable for the preparation of the present mercury complexes include the hydrocarbon amines such aniline, the ar-alkylanilines such as 2-, 3-, 2,4-, 2,6-, 3,4- or 3,5-xylidene, cumidine, 2-, 3- or 4-ethyl or tert-butylaniline, benzylamine, a-methylbenzylamine, 2,3- or 4-isopropylbenzylamine, α- or β-naphthylamine, 2-, 3- or 4-biphenylamine, 2-amyl-4-biphenylamine, phenethylamine, etc. The aromatic ring of the benzenoid amine may be substituted by one or more non-hydrocarbon radicals, e.g., by the cyano, nitro, hydroxy, mercapto, thiol, alkoxy, and sulfo radicals or by chlorine and bromine. Thus there are provided complexes of one atom of mercury with the reaction product of two moles of acrylonitrile and two moles of a benzenoid amine such as 2-, 3- or 4-chloroaniline, 2,3 or 3,5-dichloroaniline, 2-, 3- or 4-anisidine, 2-, 3- or 4-aminobenzonitrile, 2-, 3- or 4-aminophenol, 2-, 3- or 4-nitroaniline, 2,3-dichloro-4,6-dinitroaniline, 2-tert-butyl-4-nitroaniline, β-chloro-α-naphthylamine, 4'-propoxy-4-biphenylamine, 2-, 3- or 4-aminobenzenethiol, etc.

While I do not know the mechanism by which the present benzenoid amine-mercury complexes are formed, it is probable that the reaction proceeds through primary formation of a β-(arylamino)propionitrile:

$$RNH_2 + CH_2:CHCN \rightarrow RNHCH_2CH_2CN$$

and subsequent addition of two moles of the amino nitrile to a mercury ion which originates from the mercuric salt in the presence of which the reaction is effected.

Mercuric salts employed for the preparation of the present complexes are, e.g., salts of organic acids such as mercuric acetate, propionate, butyrate, benzoate, a-naphthoate, p-toluenesulfonate; or of inorganic acids such as mercuric sulfate, nitrate, phosphate, etc. For ease in manipulation and good yield of the complex product the mercury salts of paraffinic monocarboxylic acids having from 2 to 5 carbon atoms are preferred.

Reaction of the benzenoid amine, acrylonitrile and mercury salt takes place readily by allowing a mixture of the three constituents to stand at ordinary or increased temperatures until formation of the complex has taken place. Heating at a temperature of from, say, 50° C. to the refluxing temperature of the reaction mixture is recommended. The benzenoid amine and acrylonitrile are advantageously present in substantially equimolar proportions with respect to each other; however, an excess of either the amine or the acrylonitrile may be employed, since either material, when present in excess, may be recovered from the resulting reaction product. The mercuric salt is advantageously present in minor proportion with respect to the other reactants. The excess of amine and possibly of the acrylonitrile thus provides for the presence of a basic material which unites with the other ion of the mercury salt. If desired, however, the mercuric salt, also, may be present in the stoichiometric proportion, i.e., one mole of mercury salt per two moles each of the amine and nitrile, and the reaction effected in the presence of an extraneous basic material or hydrogen donor which is unreactive with either the amine or the acrylonitrile, e.g., a tertiary amine or alcohol. Also, although the present condensation proceeds readily in the absence of an extraneous solvent, in some instances, particularly when working with the higher molecular amines, an inert solvent or diluent may be employed.

The presently provided complexes are stable, well-defined products which are generally crystalline solids. While they may be advantageously employed for a variety of commercial and agricultural purposes, they are particularly valuable as biological toxicants, e.g. against bacteria and fungi, as will be hereinafter disclosed. The present complexes also show promise as peptizers, stabilizers and antidegradants in rubber technology.

The invention is further illustrated, but not limited, by the following example:

Example 1

To a 500 ml. flask, there were charged 186 g. (2.0 moles) of aniline, 106 g. (2.0 moles) of acrylonitrile, and 10.2 g. (5.5% by weight of the aniline) of mercuric acetate. The resulting mixture was stirred and heated rapidly to reflux (98° C.), and refluxing was continued for 2 hours and 45 minutes, at which point the temperature of the reaction mixture was 100° C., and 5 additional grams of the mercuric acetate was added. Refluxing was continued for another 15 minutes and the reaction mixture was then allowed to stand at room temperature for several days. The crystalline solid which separated out was filtered and dried to give 26.2 g. of the crude complex of one atom of mercury with two moles of 3-anilinopropionitrile, M.P. 205° C. It was insoluble in water, ether and ethanol, and somewhat soluble in acetone and carbon tetrachloride. Upon washing the crude complex with ether and filtering, there was obtained 20.5 g. of the purer complex, M.P. 208–210° C. Distillation of the combined filtrates gave 81 g. (77%) of acrylonitrile, 151 g. (81%) aniline and 33 g. (11.3%) of a dark viscous fluid as residue. This was dissolved in ethanol, decolorized with charcoal, filtered and cooled to give another 1.2 g. of the complex. There was thus obtained a total of 21.7 g. (92.5% theoretical yield) of the complex:

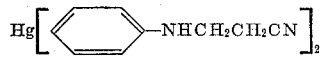

Analysis of said complex gave the following values:

| | Found | Calcd. for $C_{18}H_{20}N_4Hg$ |
|---|---|---|
| Percent C | 43.17 | 43.9. |
| Percent H | 4.05 | 4.1. |
| Percent N | 11.77 | 11.4. |
| Percent Hg | 41.0 | (by difference) 40.6. |

Operating as in the above example, 2-toluidine or 4-chloroaniline reacts with acrylonitrile and mercuric acetate or mercuric sulfate to give the complex
$Hg(CH_3C_6H_4NHCH_2CH_2CN)_2$ or the complex
$Hg(ClC_6H_4NHCH_2CH_2CN)_2$.

Other modes of preparing the present complexes may be employed instead of those described in this example, change being made as regards the temperature, time and proportion of reactants employed. Also, if desired, instead of using only one benzenoid amine in the reaction mixture, there may be prepared mixed complexes by employing with two moles of the acrylonitrile, one mole of one benzenoid amine and one mole of another benzenoid amine. There are thus obtained complexes of the formula

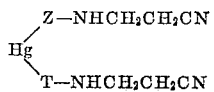

wherein Z and T signify different benzenoid radicals.

Example 2

The complex of one atom of mercury with two moles of anilinopropionitrile which was prepared in Example 1 was tested against bacteria and fungi employing the following testing procedure:

The test compound was dissolved in acetone to give a 1% stock solution. This was then added either to sterilized nutrient agar (for the bacteriostat tests) or to sterilized malt agar (for the fungistat tests) to give respective test samples containing 1 part of the test compound per 1,000 parts of the agar, or per 100,000 parts of the agar. Petri dishes were respectively filled with each of the test samples, and the respective plates thus prepared were then inoculated with the organisms shown below. Those of the plates which had been inoculated with bacteria were incubated for 48 hours at 37° C., whereas those which had been inoculated with fungi were incubated for 15 days at 25° C. At the end of these periods, inspection of the plates showed that at the 1/100, 1/10,000 and the 1/100,000 concentrations the following organisms were completely inhibited:

*Micrococcus pyogenes* var. *aureus* ATCC 6538
*Bacillus cereus* var. *mycoides* IPC 509
*Bacillus subtilis*—Lambert
*Aspergillus niger* IPC 144
*Penicillium expansum* IPT 126
*Fomes annosus* FPL 517
Trichoderma sp. T–1, ATCC 9645
*Ceratostomella pilifera* ATCC 8713
*Aspergillus oryzae* ATCC 10196
*Myrothecium verrucaria* ATCC 9095
*Monilinia fructicola*, U. of Ill.
*Lenzites trabea*—Madison 617

Repetition of the tests at a concentration of 1/1,000,000 showed complete inhibition of the following organisms:

*Fomes annosus* FPL 517
*Ceratostomella pilifera* ATCC 8713
*Myrothecium verrucaria* ATCC 9095
*Lenzites trabea*—Madison 617

Similarly useful are the complexes prepared from mercury salts, acrylonitrile and other aromatic amines, e.g., α- or β-naphthylamine or 2-, 3-, or 4-aminobiphenyl or complexes of the formula Hg(alk-C$_6$H$_4$NHCH$_2$CH$_2$CN)$_2$ where alk denotes an alkyl radical of from 1 to 6 carbon atoms which complexes are prepared from the nuclearly alkylated anilines or the Hg(Cl—C$_6$H$_4$NHCN$_2$CH$_2$CN)$_2$ complexes which are obtained according to the invention from the chloroanilines.

The present bacteriostat and fungistat compositions are characterized by a high degree of efficacy in that even in the very low concentrations they completely inhibit bacterial and mold growth. Bacteriostatic and fungistatic compositions comprising the present complexes are prepared by incorporating them into an inert carrier, which carrier may be a liquid or a powdered or granulated solid. The liquid compositions may be prepared by simply dissolving the complex in an organic solvent therefor, but they are most advantageously formulated by dispersing them in water with the aid of a dispersing agent or by preparing oil-in-water emulsions therefrom. Dispersing or emulsifying agents employed are ionic or non-ionic surfactants such as the long-chained polyalkylene glycols, the long-chained alkyl sulfosuccinates or the long-chained N-alkyl polyalkylene polyamines. In preparing the aqueous dispersions, the complex is simply added to water and agitated in the presence of the dispersing agent, which agent is present in the water in a concentration of, say, from 0.0001 percent to 1.0 percent by weight based on the total weight of the water and the complex. The oil-in-water emulsions are most conveniently formulated by first preparing an organic solution of the complex and then adding the solution to water containing the dispersing or emulsifying agent. Concentrated emulsions containing say, from 25 percent to 50 percent of the complex may thus be prepared and dispensed for formulation by the consumer into dilute aqueous compositions containing the very small amounts of active ingredient, i.e., the complex. The diluted aqueous oil-in-water emulsions may be used directly as a sterilizing medium or as bacteria or fungus growth-retarding composition. The present complexes are present in the diluted emulsions in concentrations of the order of 0.1 g. per 100 cc. of emulsion; however, in many instances, depending upon the nature of the individual complex and that of the microorganism against which it is used, emulsions containing as little as 0.0001 g. per 100 cc. of water have been found to be useful.

Dusts or powders with which the present complexes are formulated to give bacteriostatic and fungistatic compounds include talc, finely powdered pumice or chalk, etc. Bacteriostatic and fungistatic compositions comprising the present complexes may also be prepared by incorporating them in to readily volatilizable organic solvents in effective proportions and preparing aerosol bombs from such solutions. The difluorodichloromethanes and other "Freon" type materials are useful in such formulations.

This application is a division of my copending application Serial No. 705,107, filed December 26, 1967, and issued as Patent No. 2,913,470.

What I claim is:

1. A composition effective against microorganisms selected from the class consisting of bacteria and fungi comprising an oil-in-water emulsion of an organic mercury containing complex compound of the formula:

Hg(R—NHCH$_2$CH$_2$CN)$_2$ in which R is an aromatic radical of from 6 to 12 carbon atoms, said complex compound being present in the composition in a quantity which is toxic to the bacteria and to the fungi.

2. A bacteriostatic composition comprising an oil-in-water emulsion of an organic mercury containing complex compound of the frmula:

Hg(R—NHCH$_2$CH$_2$CN)$_2$ in which R is an aromatic radical of from 6 to 12 carbon atoms, said complex compound being present in the composition in a quantity which inhibits the growth of bacteria.

3. A fungistatic composition comprising an oil-in-water emulsion of an organic mercury containing complex compound of the formula:

Hg(R—NHCH$_2$CH$_2$CN)$_2$ in which R is an aromatic radical of from 6 to 12 carbon atoms, said complex compound being present in the composition in a quantity which inhibits the growth of fungi.

4. A bacteriostatic composition comprising an oil-in-water emulsion of an organic mercury-containing complex compound of the formula:

Hg(ar-NHCH$_2$CH$_2$CN)$_2$ in which ar denotes an aryl radical of from 6 to 12 carbon atoms, said complex compound being present in the composition in quantity which inhibits the growth of bacteria.

5. A fungistatic composition comprising an oil-in-water emulsion of an organic mercury-containing complex compound of the formula:

$$Hg(ar-NHCH_2CH_2CN)_2$$

in which ar denotes an aryl radical of from 6 to 12 carbon atoms, said complex compound being present in the composition in quantity which inhibits the growth of fungi.

6. A bacteriostatic composition comprising an organic mercury-containing complex of the formula:

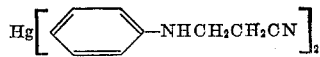

said complex compound being present in the composition in quantity which inhibits the growth of bacteria.

7. A fungistatic composition comprising an organic mercury-containing complex of the formula:

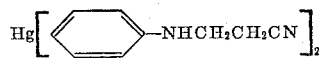

said complex compound being present in the composition in quantity which inhibits the growth of fungi.

8. The method of inhibiting the growth of microorganisms selected from the class consisting of bacteria and fungi which comprises exposing said organisms to a growth-inhibiting quantity of an organic mercury-containing complex of the formula:

$$Hg(R-NHCH_2CH_2CN)_2$$

in which R is an aromatic radical of from 6 to 12 carbon atoms.

9. The method of inhibiting the growth of bacteria which comprises exposing the bacteria to the growth-inhibiting quantity of an organic mercury-containing complex of the formula:

$$Hg(R-NHCH_2CH_2CN)_2$$

in which R is an aromatic radical of from 6 to 12 carbon atoms.

10. The method of inhibiting the growth of fungi which comprises exposing the fungi to a growth-inhibiting quantity of an organic mercury-containing complex of the formula $$Hg(R-NHCH_2CH_2CN)_2$$

in which R is an aromatic radical of from 6 to 12 carbon atoms.

11. The method of inhibiting the growth of bacteria which comprises exposing the bacteria to the growth-inhibiting quantity of an organic mercury-containing complex of the formula $$Hg(ar-CH_2CH_2CN)_2$$

in which ar denotes an aryl radical of from 6 to 12 carbon atoms.

12. The method of inhibiting the growth of fungi which comprises exposing the fungi to a growth-inhibiting quantity of an organic mercury-containing complex of the formula $$Hg(ar-CH_2CH_2CN)_2$$

in which ar denotes an aryl radical of from 6 to 12 carbon atoms.

13. The method of inhibiting the growth of bacteria which comprises exposing the bacteria to the growth-inhibiting quantity of an organic mercury-containing complex of the formula

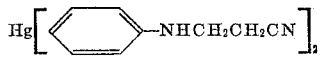

14. The method of inhibiting the growth of fungi which comprises exposing the fungi to a growth-inhibiting quantity of an organic mercury-containing complex of the formula

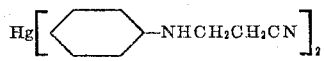

No references cited.